Oct. 16, 1923.                                                    1,470,922
                        E. G. HULSE
                      RESILIENT TIRE
                    Filed March 22, 1923

INVENTOR
EDISON G. HULSE
BY
      ATTORNEY

Patented Oct. 16, 1923.

1,470,922

UNITED STATES PATENT OFFICE.

EDISON G. HULSE, OF CUMBERLAND, MARYLAND, ASSIGNOR TO KELLY-SPRINGFIELD TIRE COMPANY, OF CUMBERLAND, MARYLAND, A CORPORATION OF NEW JERSEY.

RESILIENT TIRE.

Application filed March 22, 1923. Serial No. 626,854.

*To all whom it may concern:*

Be it known that I, EDISON G. HULSE, a citizen of the United States, residing at Cumberland, in the county of Allegany and State of Maryland, have invented certain new and useful Improvements in Resilient Tires, of which the following is a specification.

My present invention has for its principal object a further improvement in the resiliency and stress-relieving features in non-pneumatic heavy duty cushion tires, beyond those specific improvements secured by my Letters Patent 1,445,768, dated February 20, 1923 and 1,447,784, dated March 6, 1923. The improvements herein disclosed relate specifically to the type of tire mainly dependent for resiliency upon the presence of stress-relieving voids active within that portion of the structure subject to strains of great intensity set up within the zone of traction.

In seeking to develop a cushion tire capable of responding to the severe requirements incident to its contemplated service, certain fundamental principles of construction are recognized as absolutely necessary in order that any degree of success shall be attained. At the same time, the attainment of this cushioning or resiliency, by more or less faithful adherence to proven methods of construction entails the creation, within the structure, of certain inherent weaknesses which are accepted by the designer as necessary. In other words, there is no ideal and accepted standard of perfection—one property or another must be sacrificed in some degree in the proportioning of a structure capable of exhibiting, in a conspicuous degree, the particular objective sought.

To fully comprehend the scope of my improvement as related to other features of the tire structure, old in the art, it is necessary to briefly set forth the functional purpose of that which is old, in coordinated relationship with that which is here disclosed as new.

In the making of a cushion tire for heavy duty, as on motor trucks, the tire structure must, of necessity, be initially resilient and capable of displacement flow under deformation stresses. In addition, the peculiar undulation or wave of the yielding material, set up in advance of the rolling contact of the tire with the road, must be relieved, at frequent intervals, by voids worked transversely of the tread surface; otherwise, the accumulated traction wave will weaken and ultimately destroy the structure.

Now the transversely directed tread voids will not, of themselves, provide the desired degree of resiliency; therefore, sub-tread voids, preferably of the continuous type—in the median plane of the structure and as large as necessary—are desirable, and are obviously located as close as is practicable to the surface of the tread in order that the displaced material shall find a place of ready accommodation.

By reference to the accompanying drawings, it is noted that the transverse tread notches are, preferably, in staggered relation, with their inwardly directed termini, preferably, overreaching the median plane of the tire in order to more effectively absorb and break up the traction wave in the material; as also to afford the maximum traction-seeking properties. The breadth of the notch cleft must be appreciable, both for wave absorbing and traction purposes.

It is also to be noted that the substantially continuous sub-tread void, just below the notch cleft and in the median plane of the tire, is worked as close to the limit depth of that portion of the notch adjacent the center of the tire as is safe. In connection with the proximity of the sub-tread void to the notch cleft, particular attention is called to the fatal weakness that would exist at this point of approach were nothing done to compensate for the loss of material here. Noting this pertinent point of weakness and taking full cognizance of all that has been done to develop this heavy duty cushion type tire, it has become the object of this invention to design a tire structure that embodies all that has been proved best in preceding similar types, and, in addition, to incorporate therein certain valuable improvements that will result in increasing the efficiency of the article; all as more fully brought out in the following discussion.

In the accompanying drawings, which merely show one of many obvious adaptations of my improvements:

Figure 1:
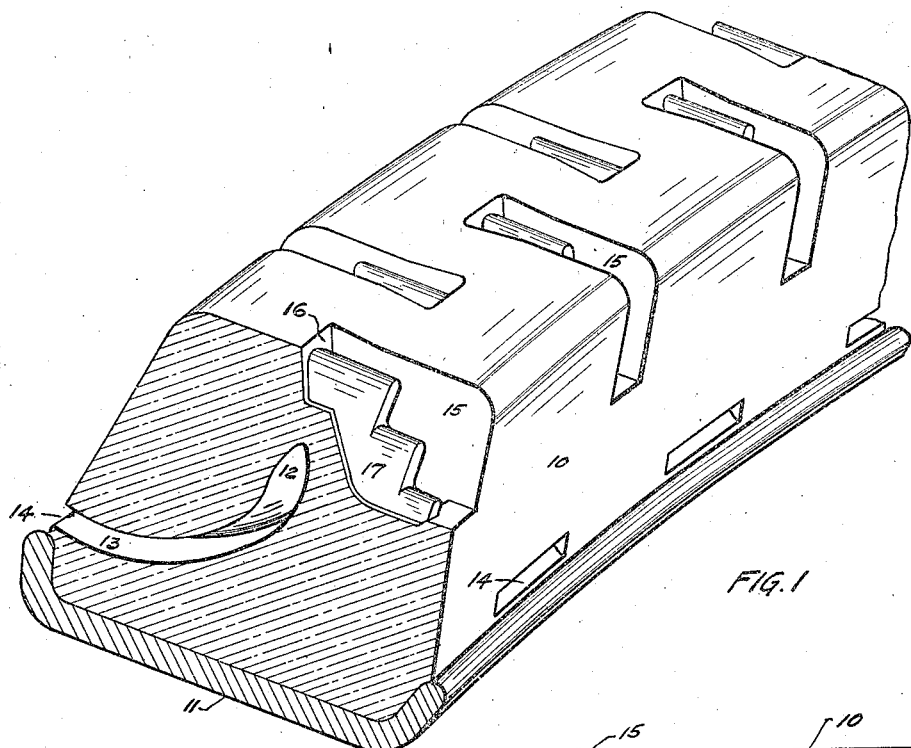
Fig. 1 is a partial perspective, in sectional view, of a preferred form; particularly showing the reinforcing web within a notch and directly bridging the weak spot over the internal sub-tread void.

My preferred tire structure 10 is shown, by way of illustration of one embodiment only, as irremovably mounted on a metallic one piece base rim 11. On the other hand, the tire could as well be of the rim-bolted type, and the rim could as well be of the well known divided type. Within the heart of the tire a preferred form of continuous or substantially continuous void 12 is worked for the purpose of increasing its resiliency; in harmony with accepted practices. Now, in the creation of this void 12, which we may term continuous or substantially continuous (dependent upon the physical relation of the instrumentalities resorted to in its formation during the molding operation), I prefer that arcuate cores or molding lugs, well known in the art and therefore not shown here, be introduced within the uncured mass, either during the building operation or as an incident to the molding process, whereby correspondingly shaped voids 13, terminating in portions 12 (heretofore mentioned) are left within the mass when the void-forming instrumentalities are removed. (The drawings being expressive of this feature and operation.)

Where the void 12 is formed as above noted, it is preferable that the arcuate portions 13 be arranged in staggered relation with respect to complemental features on the opposite side of the tire with circumferentially elongated openings 14 close to the base. Also, the portions 13 are preferably arranged intermediate the tread notches; which are likewise preferably in opposed staggered relation.

Figure 3:
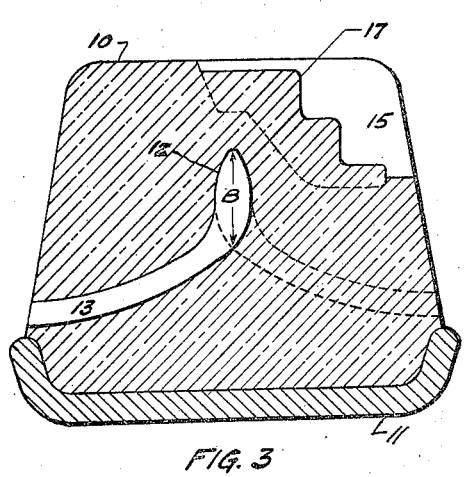
Fig. 3 is a cross section through the tire, taken directly through the reinforcing web and more fully illustrating the manner of forming the sub-tread void, as particularly set forth above.
Figure 2:
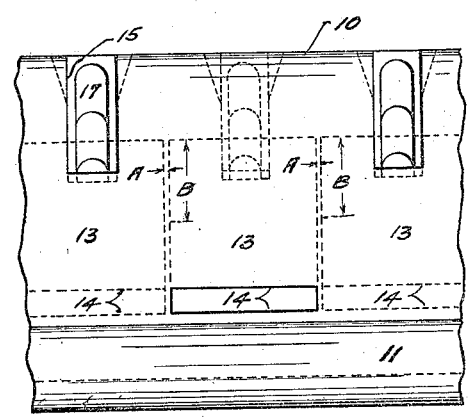
Fig. 2 is a side view of Fig. 1, particularly showing one way of forming the continuous, or substantially continuous, sub-tread void by working centrally merging voids alternately from each side of the tire.

In the event that the voids 12 are formed in the preferred manner, it is desirable, but not essential, that the portions 13 do not completely merge at their inner termini. This for the reason that there should be some tolerance allowed between the void forming instrumentalities adjacent their inner termini to avoid the necessity for precision molding practices. In Fig. 2 the clearance between portions 13 within their zone of circumferential alinement (which zone constitutes the circumferential void 12) is clearly indicated by "A." The vertical extent of the alining zone, which may be termed the vertical depth of void 12, is clearly indicated by "B" (also shown in Fig. 3).

In actual practice there would be thin dividing walls of material, of a thickness "A," along the extent of the void 12 where the preferred method of construction, above described, is followed. These divisions could, of course, be obviated by cutting the tolerances of the void forming means, or by perforating the walls "A"; thus establishing absolute continuity.

The traction and stress-relieving tread notches 15 in their preferred form are readily directed with respect to the tire structure and extend in staggered relation beyond the median plane of the structure. The notches have such width that the circumferential flow of the tire material may be accommodated therein without undue impairment by the presence of the reinforcing webs or bridges disposed within said notches. The inward termini of the notches are preferably of considerable radial depth and steeply sloped to form a definite abutment 16 against which one end of the reinforcing web is anchored. The cleft in the face of the tread, forming the transverse extent of the notch, is preferably normal to the axis of the tire structure and is enlarged toward its terminus in the tread for the purpose of increasing displacement aea and the affording ample anchorage for the reinforcing web.

The purpose and character of the reinforcing web 17 is apparent from the drawing, it being noted that this element is really an integrally molded portion of the structure 10. The preferred web is substantially parallel within the tread cleft 15, one end being anchored in the abutment 16 and the other in the bottom of the cleft near the side wall of the tire. Also, I prefer to taper the depth of the web, ouwardly, and secure this effect by a well defined series of outwardly falling steps. The breadth of the web is to be such that there is left a substantial space between either of its sides and the transversely directed vertical walls of the tread cleft, whereby displacement of the tire tread material can be accommodated. When the tire material within the zone of traction is crowded into the cleft 15 the clearance between the web 17 and the cleft walls will be so restricted, or entirely closed that no foreign matter can become lodged in that space to split the tire—this being the source of much trouble in ordinary open notch tires, or in notched tires having dirt expellers only partially effective by reason of their defective design. In prior types of cushion tires with tread clefts having secondary excrescences of rubber molded therein for the purpose of expelling or excluding road accretions the universal practice has been to attach the said excrescences in alternating arrangement to either side wall of the cleft with definite clearances between them, or else, to attach the excrescences to the bottom of the notch whereby they resemble slim upstanding cylinders.

But, in following either of these prior expedients it is obvious that the closure of the gaping notch is imperfect, and this being the case, small pebbles and coarse sand and the like find lodgement deep within the notch and abrade the material when thus entrapped.

The continuous parallel reinforcing web of my invention acts to completely seal the bottom of the notch when the sides thereof are closed under load within the zone of traction, in which inevitable relation the soft resilient web 17 will become pinched between the contracting cleft walls and elongate toward the tread surface, thus tending to actively expel any foreign matter. The web is, of course, of greatest depth centrally of the tire to give a bridging effect over the central void, but it, and the bottom of the notch cleft, are sloped outwardly toward the side wall and radially of the tire diameter in order that there shall be created a well defined inclination along which road accretions, under pressure, are induced to harmlessly work out of the notch at its juncture with the side walls. This outwardly inclined plane of notch and web, in conjunction with the notch-sealing tendency of the web over its entire extent, cooperate to form a most effective arrangement for protecting the tire from the destructive effects of entrapped foreign matter.

Having now described my invention fully what I claim is:

1. A resilient tire having a sub-tread void, transversely directed clefts in the tread portions sloping from their inner termini radially inwardly of the tire circumference toward the tire side walls, each of said clefts being partially obstructed by a web integrally united with the bottom and inwardly directed terminus thereof and extending parallel with its said transverse extent, said web being of less depth toward the side of the tire than at its opposed terminus.

2. A resilient tire having transversely directed clefts in the tread portion progressively deepened from their inner termini toward the tire side walls, each of said clefts being partially obstructed by a resilient web molded in union with the bottom and inwardly directed terminus thereof and extending parallel with its transverse extent.

3. A resilient tire having substantially parallel-sided transversely directed clefts in the tread portion progressively deepened from their inner termini toward the tire side walls, each of said clefts being partially obstructed by a resilient web molded integrally into the bottom and inwardly directed terminus thereof and extending parallel with its transverse extent, said web being progressively reduced in depth toward the tire side walls.

4. A resilient tire having substantially parallel-sided transversely directed clefts in the tread portion, each said cleft being paralleled and partially obstructed by an integral resilient web having substantially parallel sides, said webs being united along the bottom and inwardly directed terminus thereof and diminished in depth toward the tire side walls.

In testimony whereof I affix my signature.

EDISON G. HULSE.